Patented Mar. 19, 1946

2,396,719

UNITED STATES PATENT OFFICE 2,396,719

LUBRICANTS

John M. Musselman, South Euclid, and Herman P. Lankelma, Shaker Heights, Ohio, assignors to The Standard Oil Company, Cleveland, Ohio, a corporation of Ohio No Drawing. Application March 29, 1943, Serial No. 481,005

18 Claims. (Cl. 252—46.6)

This invention relates to lubricants, and more particularly lubricants which are subject to severe usage conditions and in high temperature; and it is among the objects of the invention to provide lubricants having greater stability and resistance against change and having greater film strength than characteristic of usual petroleum lubricants.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

We have found that by reacting phosphorus pentasulphide with an alcohol, products result which have peculiar utilities as lubricants. The alcohol is desirably of rather high molecular weight. Illustrative of the alcohols are lauryl alcohol, octyl alcohol, undecanol, tetradecanol, cetyl alcohol, benzyl alcohol, terpineol, cyclo hexyl alcohol, cholesterol, etc.

The reaction between the alcohol and the phosphorus pentasulphide is carried out at elevated temperatures, sufficient for the reaction, these being generally 100 to 200° C., depending somewhat upon the particular materials, and while the action at low temperatures has been long known to form thiophosphoric compounds, we preferably react at the higher temperatures, as for instance toward 200° C., or at least sufficient to break up the thiophosphoric compounds formed at the lower temperatures, and eliminate phosphorus and produce a product characterized by a high sulphur content, and analysis of such products while showing combined sulphur for instance extending as high as 20 per cent, shows phosphorus in small amounts, such as not over a half per cent, and whether chemically combined or mechanically entrained is not clear. Usually a reaction time of one-half to an hour or somewhat more is sufficient. The materials may be taken in calculated or molecular proportions. A final excess of phosphorus pentasulphide however may be easily eliminated by filtering off. For instance, a temperature of about 175° C. for 60 minutes may be used, after which the reaction product is filtered. Similarly, other sulphides of phosphorus may be applied, as for instance phosphorus sesquisulphide, etc.

The reaction product may be used as such in gearing, or may be incorporated in an oil of lubricating viscosity, as for instance oils of 40 to 3000 viscosity Saybolt Universal at 100° F., and the amounts may be for instance 0.05–5 per cent or more.

With particular further advantage, the reaction product as foregoing, may be further reacted with a base, which may be an amine, ammonia or oxides or hydroxides of metals, for example, aluminum, lead, calcium, zinc, barium, etc. Illustrative of the amines are diamylamine, monoamylamine, butylamine, triamylamine, octylamine, tributylamine, dicyclohexylamine, quinoline, dimethylamine, dipropylamine, quinaldine, pyridine, brucine, quinine, or other amine of aliphatic, cycloparaffin or heterocyclic type, of commercially suitable availability and cost. This reaction occurs readily at temperatures in the range of 20° C. to 100° C. These products or salts may be used as above, or incorporated in oil in amounts for instance of 0.1 to 10 per cent.

As an example: 1000 parts by weight of lauryl alcohol and 300 parts by weight of phosphorus pentasulphide are reacted at a temperature sufficient to carry the action to the substantial elimination of phosphorus and attain a high percentage of combined sulphur, the temperature in this case being around 160° C. for an hour. With the reaction product, barium hydrate was further reacted in proportions of 3 to 10 parts by weight at a temperature around 99° C. for an hour and a half.

The properties of such products are illustrated in the following test results, using a test motor of Ethyl Gasoline Corp. design, with compression ratio 7:1, operating at 1200 R. P. M., with jacket temperature 100° C., sump temperature 150° C., and commercial leaded gasoline, at air fuel ratio of 15:1, and the lubricating oil being a commercial S. A. E. 30 Mid-Continent oil:

|  | Hours run | Viscosity increase | Acid number | Sludge | Skirt number |
|---|---|---|---|---|---|
| S. A. E. 30 oil+barium salt of reaction product, 6% | 20 | 38 | 1.0 | Per cent 0.15 | 0.0 |

In contrast, the S. A. E. 30 lubricating oil without the addition agent, after a run of only 10 hours showed a viscosity increase of 340, acid number 4.5, sludge 8.5%, and skirt number 3.0 (the skirt number is the rating on a scale of 10, in which 0 is the clean condition of a new piston, and 10 is the full lacquer-loaded condition from commercial oil run to break-down).

In comparison with the salt as above, the initial reaction product of the alcohol and phosphorus sulphide, subjected to the same kind of engine test showed the following results:

| | Hours run | Viscosity increase | Acid number | Sludge | Skirt number |
|---|---|---|---|---|---|
| S. A. E. 30 oil+simple initial reaction product 6% | 20 | 83 | 2.5 | Per cent 2.0 | 2.5 |

Other modes of applying the principle of the invention may be employed, change being made as regards the details described, provided the features stated in any of the following claims, or the equivalent of such, be employed.

We therefore particularly point out and distinctly claim as our invention:

1. A composition of matter suitable for use as a lubricant and as an addition agent to improve the characteristics of lubricating oils, comprising a reaction product of phosphorus pentasulfide and an alcohol reacted at a temperature above 100° C. to prevent thiophosphate formation.

2. A composition of matter suitable for use as a lubricant and as an addition agent to improve the characteristics of lubricating oils, comprising a reaction product of phosphorus pentasulfide and lauryl alcohol reacted at a temperature above 100° C. to prevent thiophosphate formation.

3. A composition of matter suitable for use as a lubricant and as an addition agent to improve the characteristics of lubricating oils, comprising a reaction product of phosphorus pentasulfide and octyl alcohol reacted at a temperature above 100° C. to prevent thiophosphate formation.

4. A composition of matter suitable for use as a lubricant and as an addition agent to improve the characteristics of lubricating oils, comprising a reaction product of phosphorus pentasulfide and cyclohexyl alcohol reacted at a temperature above 100° C. to prevent thiophosphate formation.

5. A composition of matter suitable for use as a lubricant and as an addition agent to improve the characteristics of lubricating oils, comprising a salt of the reaction product of phosphorus pentasulfide and an alcohol reacted at a temperature above 100° C. to prevent thiophosphate formation.

6. A composition of matter suitable for use as a lubricant and as an addition agent to improve the characteristics of lubricating oils, comprising a metal compound of the reaction product of phosphorus pentasulfide and an alcohol reacted at a temperature above 100° C. to prevent thiophosphate formation.

7. A composition of matter suitable for use as a lubricant and as an addition agent to improve the characteristics of lubricating oils, comprising a metal compound of a reaction product of phosphorus pentasulfide and lauryl alcohol reacted at a temperature above 100° C. to prevent thiophosphate formation.

8. A composition of matter suitable for use as a lubricant and as an addition agent to improve the characteristics of lubricating oils, comprising a metal compound of the reaction product of phosphorus pentasulfide and octyl alcohol reacted at a temperature above 100° C. to prevent thiophosphate formation.

9. A composition of matter suitable for use as a lubricant and as an addition agent to improve the characteristics of lubricating oils, comprising a metal compound of the reacting product of phosphorus pentasulfide and cyclohexyl alcohol reacted at a temperature above 100° C. to prevent thiophosphate formation.

10. A lubricant comprising a lubricating oil, and an addition agent comprising a reaction product of phosphorus pentasulfide and an alcohol reacted at a temperature above 100° C. to prevent thiophosphate formation.

11. A lubricant comprising a lubricating oil, and an addition agent comprising a metal compound of a reaction product of phosphorus pentasulfide and an alcohol reacted at a temperature above 100° C. to prevent thiophosphate formation.

12. A process for making a composition suitable for use as a lubricant and an addition agent to improve the characteristics of lubricating oils, comprising reacting phosphorus pentasulfide with an alcohol at a temperature above 100° C. to prevent thiophosphate formation.

13. A process for making a composition suitable for use as a lubricant and an addition agent to improve the characteristics of lubricating oils, comprising reacting phosphorus pentasulfide with an alcohol at a temperature above 100° C. to prevent thiophosphate formation, and reacting said product with a metal compound to form the corresponding metal compound thereof.

14. A process for making a composition suitable for use as a lubricant and an addition agent to improve the characteristics of lubricating oils, comprising reacting phosphorus pentasulfide with an alcohol at a temperature above 100° C. to prevent thiophosphate formation, and reacting said product with a base to form a salt thereof.

15. A process for making a composition suitable for use as a lubricant and an addition agent to improve the characteristics of lubricating oils, comprising reacting phosphorus pentasulfide with an aliphatic saturated alcohol having at least 8 carbon atoms at a temperature above 100° C. to prevent thiophosphate formation, and reacting said product with a metal compound to form the corresponding metal compound thereof.

16. A composition of matter suitable for use as a lubricant and as an addition agent to improve the characteristics of lubricating oils, comprising the reaction product of phosphorus pentasulfide and an aliphatic saturated alcohol having at least 8 carbon atoms reacted at a temperature above 100° C. to prevent thiophosphate formation.

17. A composition of matter suitable for use as a lubricant and as an addition agent to improve the characteristics of lubricating oil, comprising a metal compound of the reaction product of phosphorus pentasulfide and an aliphatic saturated alcohol having at least 8 carbon atoms reacted at a temperature above 100° C. to prevent thiophosphate formation.

18. A lubricant comprising a lubricating oil, and an addition agent comprising a metal compound of the reaction product of phosphorus pentasulfide and an aliphatic saturated alcohol having at least 8 carbon atoms reacted at a temperature above 100° C. to prevent thiophosphate formation.

JOHN M. MUSSELMAN.
HERMAN P. LANKELMA.